US008023564B2

(12) United States Patent
Thangaraj et al.

(10) Patent No.: US 8,023,564 B2
(45) Date of Patent: Sep. 20, 2011

(54) SYSTEM AND METHOD FOR PROVIDING DATA STARTING FROM START CODES ALIGNED WITH BYTE BOUNDARIES IN MULTIPLE BYTE WORDS

(75) Inventors: Arul Thangaraj, Bangalore (IN); Vijayanand Aralaguppe, Bangalore (IN); Syed Mohammed Ali, Bangalore (IN)

(73) Assignee: Broadcom Corporaiton, Irvine, CA (US)

( * ) Notice: Subject to any disclaimer, the term of this patent is extended or adjusted under 35 U.S.C. 154(b) by 1029 days.

(21) Appl. No.: 10/817,380

(22) Filed: Apr. 1, 2004

(65) Prior Publication Data
US 2005/0180507 A1    Aug. 18, 2005

Related U.S. Application Data

(60) Provisional application No. 60/541,608, filed on Feb. 4, 2004.

(51) Int. Cl.
H04B 1/66 (2006.01)
H04N 7/12 (2006.01)
H04N 11/02 (2006.01)
H04N 11/04 (2006.01)

(52) U.S. Cl. .................. 375/240.25; 375/240.26

(58) Field of Classification Search ............. 375/240.25
See application file for complete search history.

(56) References Cited

U.S. PATENT DOCUMENTS

| | | | | |
|---|---|---|---|---|
| RE33,632 E | * | 7/1991 | Nakamura et al. | 382/247 |
| 5,465,374 A | * | 11/1995 | Dinkjian et al. | 711/219 |
| 5,815,206 A | * | 9/1998 | Malladi et al. | 375/240.01 |
| 5,898,897 A | * | 4/1999 | Son et al. | 710/68 |
| 5,963,260 A | * | 10/1999 | Bakhmutsky | 375/240.24 |
| 5,973,740 A | * | 10/1999 | Hrusecky | 348/401 |
| 5,995,707 A | * | 11/1999 | Lee | 386/81 |
| 6,178,203 B1 | * | 1/2001 | Lempel | 375/240.24 |
| 6,799,246 B1 | * | 9/2004 | Wise et al. | 711/117 |
| 7,024,685 B1 | * | 4/2006 | Foster et al. | 725/151 |
| 7,227,899 B2 | * | 6/2007 | Balakrishnan et al. | 375/240.26 |
| 7,248,740 B2 | * | 7/2007 | Sullivan | 382/232 |
| 2003/0009722 A1 | * | 1/2003 | Sugiyama et al. | 714/779 |
| 2003/0058143 A1 | * | 3/2003 | Chiba et al. | 341/67 |
| 2004/0030665 A1 | * | 2/2004 | Sullivan | 706/48 |

* cited by examiner

*Primary Examiner* — Jayanti K Patel
*Assistant Examiner* — Jessica Prince
(74) *Attorney, Agent, or Firm* — McAndrews, Held & Malloy, Ltd.

(57) ABSTRACT

Described here are systems and methods for providing data starting from start codes aligned with byte boundaries in multiple byte words. A start code is written starting at a byte in a middle portion of a data word in a memory. An address associated with the byte is written in a table. Data is fetched from the memory starting from the byte.

8 Claims, 4 Drawing Sheets

SYSTEM AND METHOD FOR PROVIDING DATA STARTING FROM START CODES ALIGNED WITH BYTE BOUNDARIES IN MULTIPLE BYTE WORDS

RELATED APPLICATIONS

This application claims priority to "SYSTEM AND METHOD FOR PROVIDING DATA STARTING FROM START CODES ALIGNED WITH BYTE BOUNDARIES IN MULTIPLE BYTE WORDS", U.S. Provisional Patent Application, Ser. No. 60/541,608, filed Feb. 4, 2004, by Arul Thangaraj, et al., which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

During the decoding of video data, the video data includes sets of data structures, such as group of pictures, pictures, slices, macroblocks, and blocks. A video decoder decodes the video data, one picture at a time, on a slice by slice basis.

Start codes indicate the starting points for groups of pictures, pictures, and slices. When a decoding system receives video data for decoding, the decoding system places the video data into a compressed data buffer to await decoding by a video decoder. The compressed data buffer usually comprises multiple byte data words. For example, the compressed data buffer can comprise 16-byte gigantic words (gwords). The decoder system also creates a start code table the indicates the compressed data buffer data word address for each start code.

When the video decoder selects a data structure for decoding, the video decoder looks up the start code of the data structure in the start code table to determine the gword address storing the start code. The video decoder then fetches the gwords starting from the address.

It is noted, however, that the start codes can occur anywhere in the video data and are not necessarily aligned with any particular interval. Accordingly, when the start codes are stored in the compressed data buffer, the start codes do not align with gword boundaries. Therefore, when the video decoder fetches a gword containing a start code, the gword may contain the tail end of another data structure prior to the start code.

In one scheme, it is possible to assure alignment of start codes with gword boundaries by stuffing zeroes. However, in the case where a data word is 16 bytes, each alignment could add up to 15 bytes, depending on the position of the start code. A transport stream delivers the video data. The transport stream comprises fixed length packets of 188 bytes. As a result, the packets can be fetched with a direct memory access module with 256 byte buffer. However, if a transport packet includes a large number of start codes, the transport packet may require in excess of 256 bytes for storage. If a transport packet requires in excess of 256 bytes for storage, more than one access will be needed to fetch the packet.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein is a system and method for system and method for providing data starting from start codes aligned with byte boundaries in multiple byte words.

In one embodiment, there is described a method for decoding video data. The method comprises writing a start code starting at a byte in a middle portion of a data word in a memory; writing an address associated with the byte in a table; and fetching data from the memory starting from the byte.

In another embodiment, there is presented a system for decoding video data. The system comprises a memory, a table, and a direct memory access module. The memory comprises a plurality of data words, and stores a start code starting at a byte in a middle portion of a particular one of the data words. The table stores an address associated with the byte. The direct memory access module fetches data from the memory starting from the byte.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
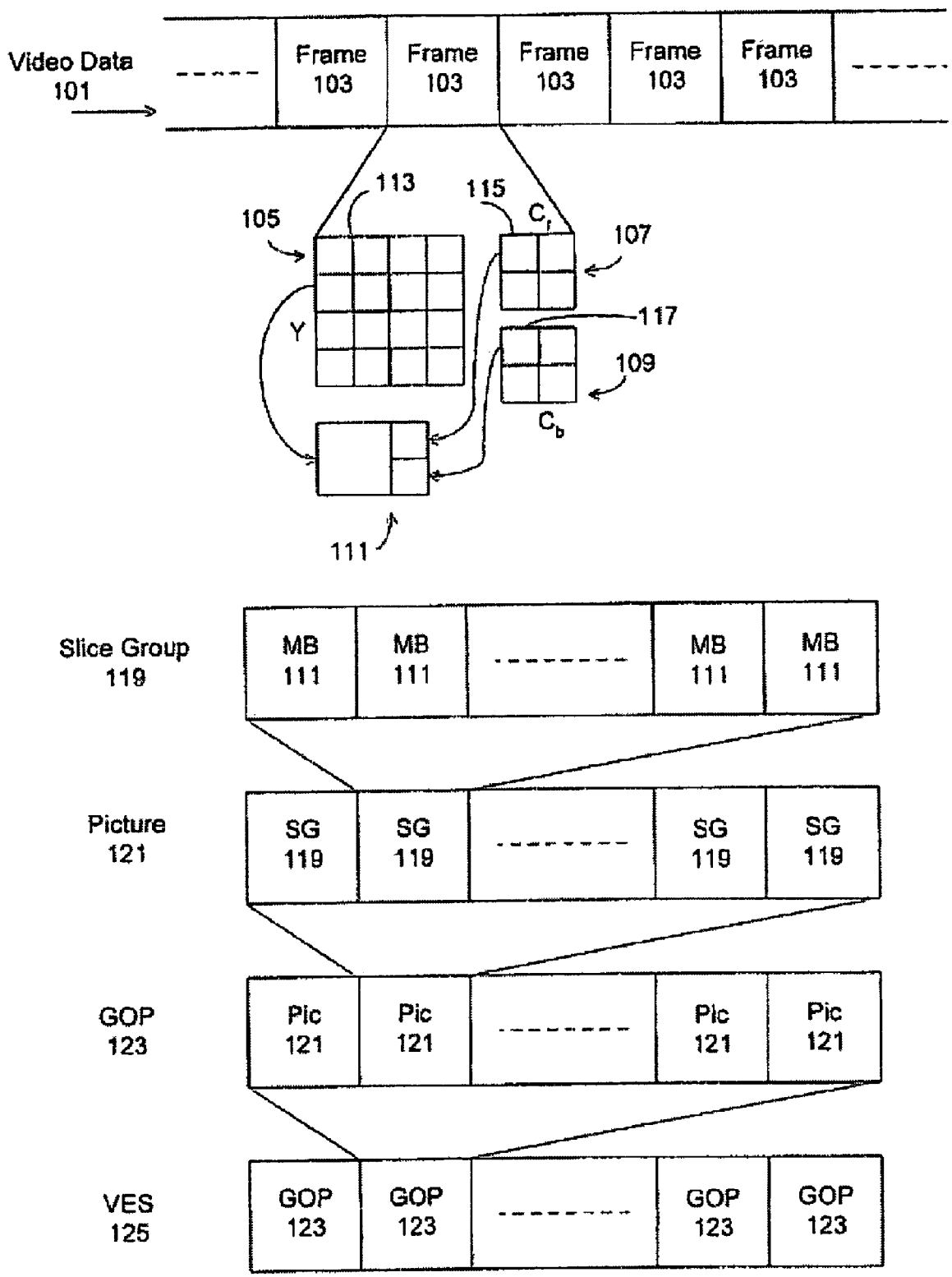
FIG. 1 illustrates a block diagram of an exemplary Moving Picture Experts Group (MPEG) encoding process, in accordance with an embodiment of the present invention.

FIG. 1 illustrates a block diagram of an exemplary Moving Picture Experts Group (MPEG) encoding process of video data 101, in accordance with an embodiment of the present invention. The video data 101 comprises a series of frames 103. Each frame 103 comprises two-dimensional grids of luminance Y, 105, chrominance red Cr, 107, and chrominance blue $C_b$, 109, pixels. The two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16×16 block area of the image.

The data in the macroblocks 111 is compressed in accordance with algorithms that take advantage of temporal and spatial redundancies. For example, in a motion picture, neighboring frames 103 usually have many similarities. Motion causes an increase in the differences between frames, the difference being between corresponding pixels of the frames, which necessitate utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 111 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, most of the macroblocks 111 are compared to portions of other frames 103 (reference frames). When an appropriate (most similar, i.e. containing the same object(s)) portion (reference pixels) of a reference frame 103 is found, the difference between the portion of the reference frame 103 and the macroblock 111 are encoded. The difference is known as the prediction error. The location of the reference pixels in the reference frame 103 is recorded as a motion vector. The encoded difference and the motion vector form part of the data structure encoding the macroblock 111. In the MPEG-2 standard, the macroblocks 111 from one frame 103 (a predicted frame) are limited to prediction from portions of no more than two reference frames 103. It is noted that frames 103 used as a reference frame for a predicted frame 103 can be a predicted frame 103 from another reference frame 103.

The macroblocks 111 representing a frame are grouped into different slice groups 119. The slice group 119 includes the macroblocks 111, as well as additional parameters describing the slice group. Each of the slice groups 119 forming the frame form the data portion of a picture structure 121. The picture 121 includes the slice groups 119 as well as additional parameters that further define the picture 121.

The pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence. The packetized elementary stream is further packetized into fixed 192-byte (including a 4 byte header, and 188-bytes of data) packets, known as transport packets.

The transport packets can be multiplexed with other transport packets carrying other content, such as another video elementary stream 125 or an audio elementary stream. The multiplexed transport packets form what is known as a transport stream. The transport stream is transmitted over a communication medium for decoding and displaying.

Figure 2:
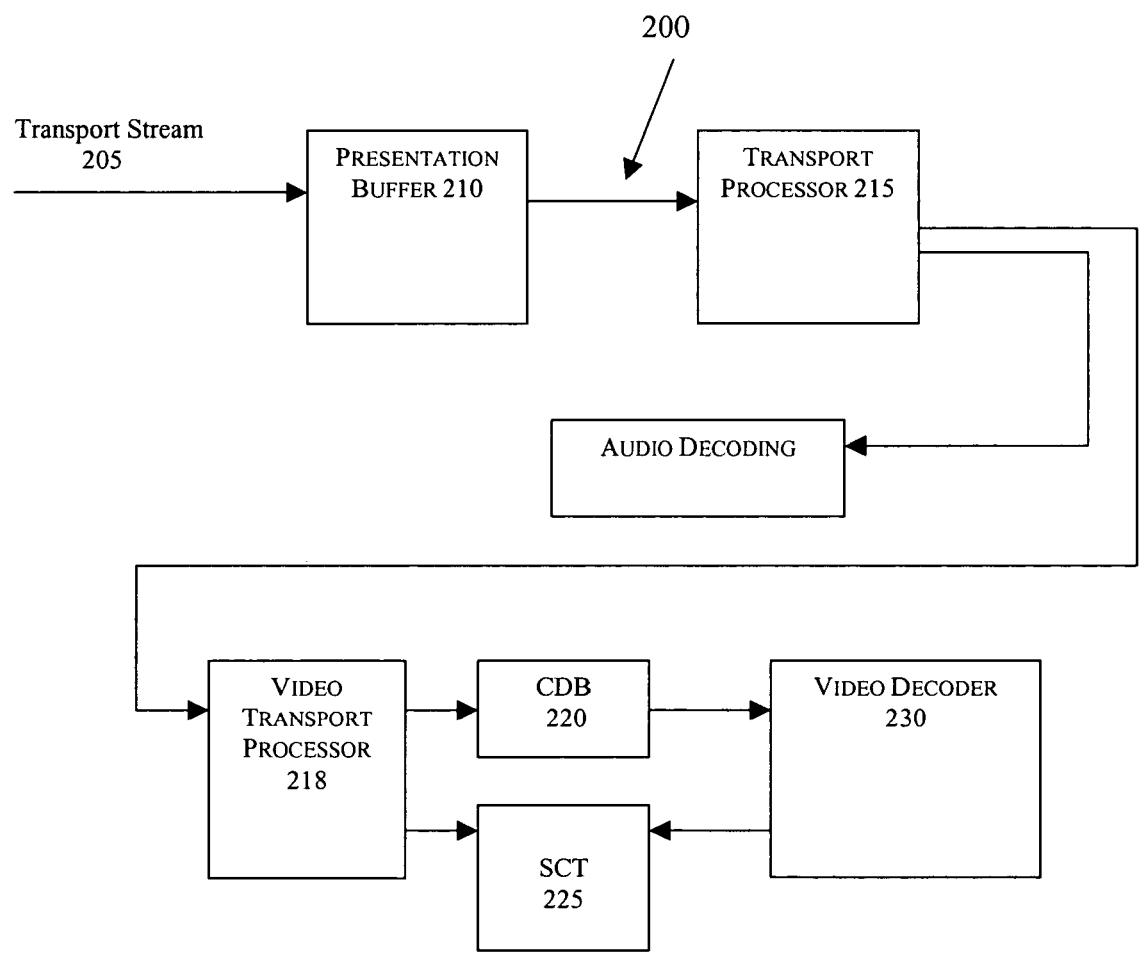
FIG. 2 is a block diagram of an exemplary decoder system in accordance with an embodiment of the present invention.

Referring now to FIG. 2, there is illustrated a block diagram describing an exemplary decoder system 200 in accordance with an embodiment of the present invention. The decoder system 200 receives a transport stream 205 and stores the transport stream 205 in a transport stream presentation buffer 210. The transport stream presentation buffer 210 can comprise memory, such as synchronous dynamic random access memory (SD-RAM).

A transport processor 215 demultiplexes the transport stream 205 into constituent elementary streams. For example the transport stream can comprise any number of video and audio elementary stream constituents. Additionally, the transport processor 215 parses and processes the transport header information from the transport streams stored in the transport stream presentation buffer 210. The constituent audio elementary streams can be provided to an audio decoding section of the decoder system 200.

A video transport processor 218 writes video elementary stream 125 to a compressed data buffer 220. As noted above, the video elementary stream 125 comprises a hierarchy of various structures, such as GOPs 123, pictures 121, slice groups 119, and macroblocks 111. The starting point of the foregoing is indicated in the video elementary stream 125 by what is known as a start code.

As the transport processor 218 writes the video elementary stream 125 to the compressed data buffer 220, the transport processor 215 also maintains a start code table 225. The start code table 225 comprises records of start codes and the address in the compressed data buffer 220 storing the start code.

A video decoder 230 decodes the video elementary stream 125 stored in the compressed data buffer 220. The video decoder 230 decodes the video elementary stream 125 on a picture-by-picture basis, and decodes the pictures on a slice-by-slice basis. The coding of the slice structure allows for concurrent decoding of multiple slices by hardware in parallel.

The video decoder 230 can decode a number of slices concurrently. The video decoder 230 begins decoding a slice by fetching the slice from the compressed data buffer 220. To determine the address that the slice group is stored in the compressed data buffer 220, the video decoder 230 looks up the start code for the slice in the start code table 225.

The compressed data buffer 220 is a memory system comprising multiple byte data words. For example, the compressed data buffer 220 can comprise a DRAM with 16 byte gigantic words (gwords). The start codes align with byte boundaries, but do not necessarily align with gword boundaries. The start code table indicates the byte address in the compressed data buffer 220 where the start code is stored. The video decoder 230 is capable of fetching from the compressed data buffer 220 with byte size granularity.

Figure 3:
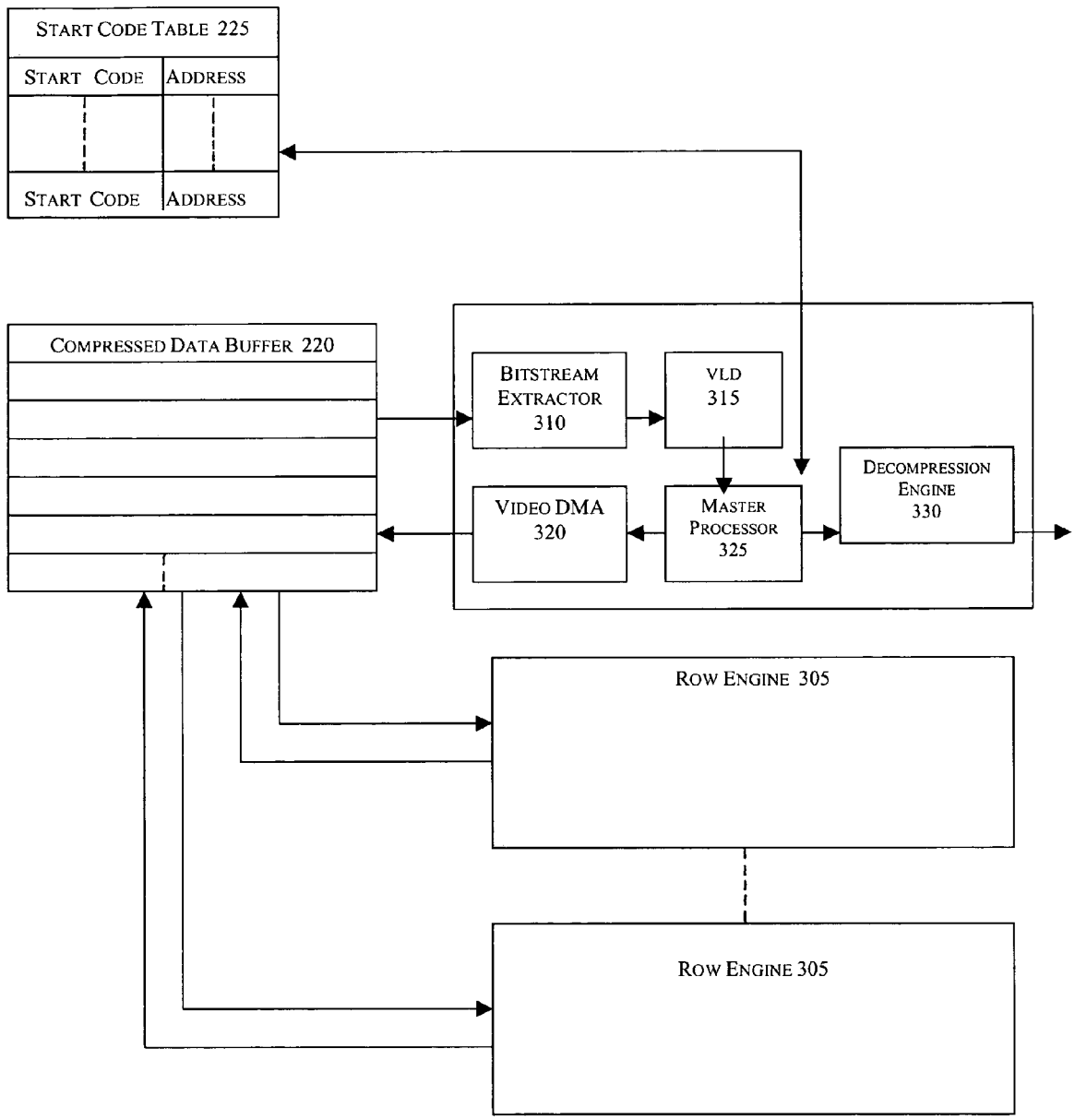
FIG. 3 is a block diagram describing an exemplary video decoder in accordance with an embodiment of the present invention.

Referring now to FIG. 3, there is illustrated a block diagram describing an exemplary video decoder 230 in accordance with an embodiment of the present invention. The video decoder 230 comprises any number of row engines 305. Each row engine 305 can decode a slice concurrently with the other row engines 305.

The row engines 305 comprise a bitstream extractor 310, a variable length decoder 315, a video direct memory access (DMA) module 320, a master processor 325, and a decompression engine 330. The row engine 305 begins decoding a slice by fetching the slice from the compressed data buffer 220. The master processor 325 looks up the start code corresponding to the slice in the start code table 225 to find the address of the memory location in the compressed data buffer 220 storing the slice start code. This is the starting address for the slice. The master processor 325 also looks up the next start code in the start code table 225 to find its address in the compressed data buffer 220. The byte preceding this address is the ending address for the slice.

As noted above, the address is a byte address but does not necessarily correspond to the beginning of a gword. Accordingly, the video DMA 320 is equipped to provide data from the compressed data buffer 220 with byte-size granularity. The master processor 325 commands the DMA 320 to fetch the data in compressed data buffer 220 from the starting address to the ending address.

Responsive thereto, the video DMA 320 provides the data, and the data is received by the bitstream extractor 310. The bitstream extractor 310 provides the data to the variable length decoder 315. The variable length decoder 315 decodes variable length coded symbols and provides them to the master processor 325. The master processor 325 then provides the video data to the decompression engine 330. The decompression engine 330 decompresses the video data.

Figure 4:
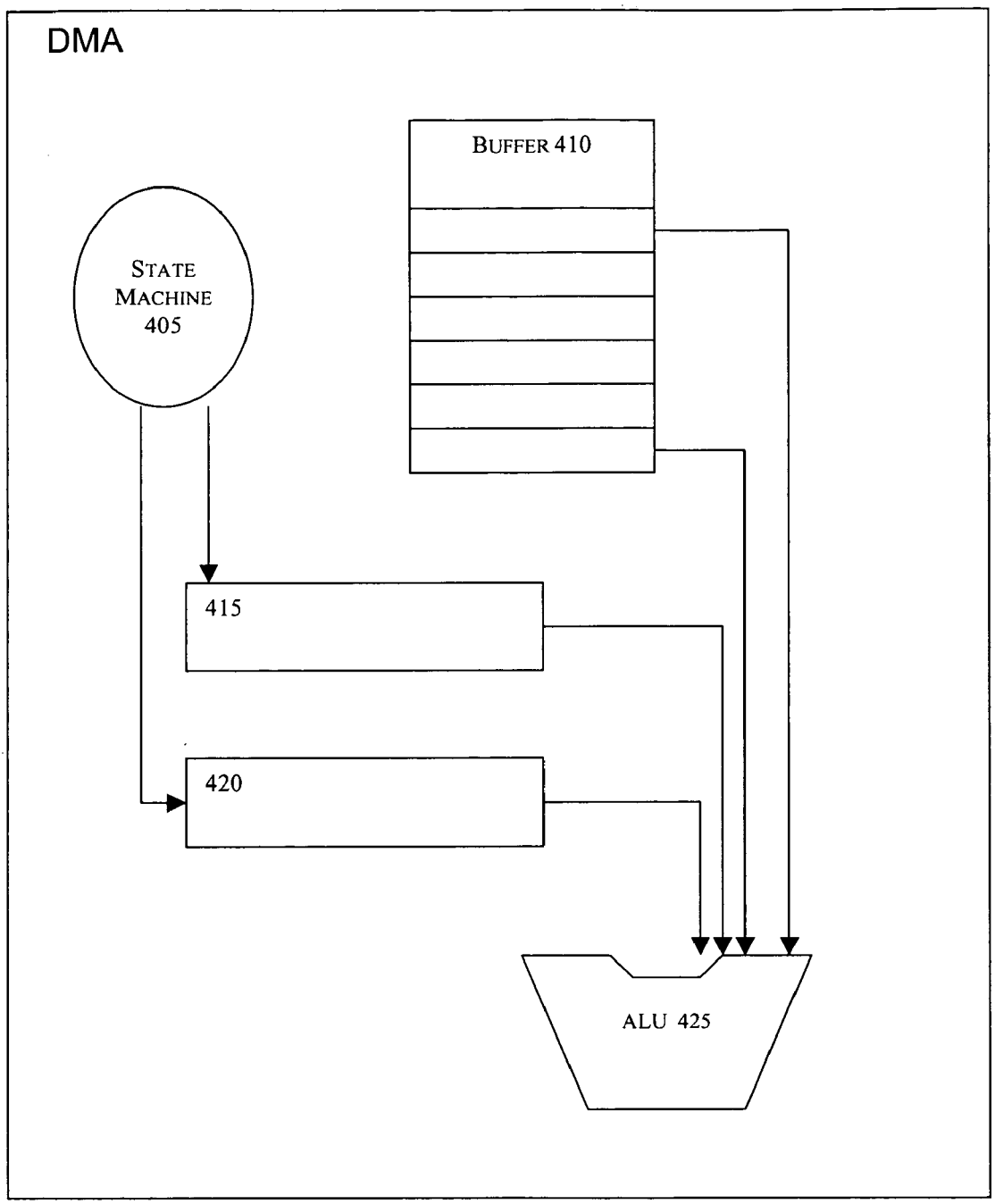
FIG. 4 is a block diagram of an exemplary direct memory access module in accordance with an embodiment of the present invention.

Referring now to FIG. 4, there is illustrated a block diagram of an exemplary direct memory access module 320 in accordance with an embodiment of the present invention. The direct memory access module comprises a state machine 405, a buffer 410, a first mask register 415, a second mask register 420, and an arithmetic logic unit 425.

As noted above, the start codes fall on byte boundaries but do not necessarily fall on data word boundaries. When the master processor 325 commands the direct memory access module 320 to fetch the data between the address of the start code, and the address preceding the next start code, the direct memory access module 320 retrieves the data word containing the byte where the start code begins, and the data word containing the address preceding the start of the next start code. The foregoing can be achieved by truncating the four least significant bits of the addresses.

The data words are loaded into the buffer 410. The buffer 410 comprises data words that are equal in length to the data words of the memory. Unless the start code begins on the first byte of a data word, the first data word will contain an ending portion of another data structure prior to the start code. Unless the next start code begins on the first byte of a data word, the last data word will contain a starting portion of another data structure, starting from the next start code.

The direct memory access module 320 discards the starting and ending portions of other data structures with the first mask register 415 and the second mask register 420. The first mask register 415 is equal in length to a data word in the memory. The state machine 405 writes a pattern to the first mask register 415, wherein each byte in the first mask register 415 corresponding to a byte position that is less than the four least significant bits of the starting address are loaded with a $0, and wherein each byte in the first mask register 415 corresponding to a byte position that is equal or greater than the four least significant bits of the starting address are loaded with a $F.

The second mask register 420 is also equal in length to a data word in the memory. The state machine 405 writes a pattern to the second mask register 420, wherein each byte in the second mask register 420 that corresponds to a byte position that is less than or equal to the four least significant bits of the ending address is loaded with a $F, and wherein each byte in the second mask register 420 corresponding to a byte position that is greater than the four least significant bits of the ending address is loaded with a $0.

The state machine 405 then causes the arithmetic logic unit 425 to perform a bit by bit logical AND operation between the first data word in the buffer 410 and the first mask register 415. The foregoing results in zeroing the ending portion of the previous data structure that precedes the start code. Similarly, the state machine 405 then causes the arithmetic logic unit 425 to perform a bit by bit logical AND operation between the last data word in the buffer and the second mask register 420. The foregoing results in zeroing the starting portion of the next data structure. The direct memory access module 320 then provides the contents of the buffer 410 to the bit stream extractor 310.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for decoding video data, said system comprising:
    a compressed data buffer memory comprising a plurality of data words, for storing a start code starting at a byte in a middle portion of a particular one of the data words;
    a table for storing a starting address associated with the byte;
    a direct memory access module for providing data from the memory starting from the starting address in the middle portion of the data word;
    a video decompression engine for decompressing the data from the memory starting from the starting address in the middle portion of the data word, thereby resulting in decompressed video data; and
    a frame buffer for storing the decompressed video data; and
    wherein the direct memory access module further comprises:
        a buffer comprising a plurality of data words for storing the video data from the starting address;
        a first masking register for discarding a portion of a first data structure that precedes the starting address, the first masking register comprises a plurality of bytes corresponding to byte positions of the data words; and
        a state machine for loading the first masking register with a pattern wherein each byte of the plurality of bytes in the first mask register that corresponds to a byte position that is less than the four least significant bits of the starting address are loaded with a first value, and wherein each byte of the plurality of bytes in the first mask register that corresponds to a byte position that is equal or greater than the four least significant bits of the starting address are loaded with a second value.

2. The system of claim 1, further comprising:
    a video transport processor for writing the start code starting at a byte in a middle portion of the particular data word in the memory.

3. The system of claim 1, wherein the start code is associated with a slice.

4. The system of claim 1, wherein the data word comprises at least 16 bytes.

5. The system of claim 1, wherein the video transport processor writes another start code to another byte in a middle portion of another data word in the memory and wherein the table stores another address associated with the another byte in the table and wherein the direct memory access module fetches data from the memory starting from the byte and ending with a byte preceding the another byte.

6. The system of claim 5, further comprising:
a master processor for looking up the address in the table.

7. The system of claim 6, wherein the master processor looks up the another address in the table.

8. The direct memory access module of claim 1, wherein the first value is a hexadecimal 0 and wherein the second value is a hexadecimal F, and further comprising:
an arithmetic logic unit for performing a logical AND operation between a first one of the plurality of data words in the buffer and the first masking register.

* * * * *